United States Patent
Eidam et al.

(10) Patent No.: US 6,951,628 B2
(45) Date of Patent: *Oct. 4, 2005

(54) METHOD FOR PRODUCING A SCATTERED RADIATION GRID OR COLLIMATOR

(75) Inventors: Rico Eidam, Langensteinbach (DE); Martin Hoheisel, Erlangen (DE); Martin Schäfer, Berlin (DE); Hartmut Sklebitz, Erlangen (DE); Peter Strattner, Heilsbronn (DE)

(73) Assignee: Siemens Aktiengesellschaft, Munich (DE)

( * ) Notice: Subject to any disclaimer, the term of this patent is extended or adjusted under 35 U.S.C. 154(b) by 339 days.

This patent is subject to a terminal disclaimer.

(21) Appl. No.: 10/259,646

(22) Filed: Sep. 30, 2002

(65) Prior Publication Data

US 2003/0072415 A1 Apr. 17, 2003

(30) Foreign Application Priority Data

Sep. 28, 2001 (DE) .......................................... 101 47 947

(51) Int. Cl.⁷ ................................................. G21K 1/00
(52) U.S. Cl. ...................... 264/401; 378/145; 378/154; 430/4; 264/221; 264/497
(58) Field of Search .................................. 378/145, 147, 378/149, 154, 34, 35, 98.8, 155, 164, 204; 264/400, 401, 482; 425/174, 174.4; 430/4, 321, 322; 250/505.1; 700/119, 120

(56) References Cited

U.S. PATENT DOCUMENTS

| | | | |
|---|---|---|---|
| 5,814,235 A | 9/1998 | Pellegrino et al. | |
| 5,970,118 A | 10/1999 | Sokolov | |
| 6,185,278 B1 | 2/2001 | Appleby et al. | |
| 2003/0089857 A1 * | 5/2003 | Hoheisel et al. | ....... 250/370.09 |

FOREIGN PATENT DOCUMENTS

EP 0 681 736 11/1995

OTHER PUBLICATIONS

G.A. Kastis et al., "A Small–Animal Gamma–Ray Imager Using a CdZnTe Pixel Array and a High–Resolution Parallel–Hole Collimator".

* cited by examiner

Primary Examiner—Michael P. Colaianni
Assistant Examiner—David Beck
(74) Attorney, Agent, or Firm—Young & Thompson (57) ABSTRACT

A method for producing a scattered radiation grid or collimator which, for an incident radiation type, has transmissive regions and nontransmissive regions of predeterminable geometry. First the geometry of the transmissive and the nontransmissive regions of the scattered radiation grid or collimator is set. On the basis of this geometry, a base body is constructed according to the geometry, optionally differing by a particular layer thickness, of the transmissive regions or the nontransmissive regions by a rapid prototyping technique through layer-wise solidification of a structural material under the action of radiation. On the basis of this base body, the scattered radiation grid or collimator is finally completed.

21 Claims, 5 Drawing Sheets

FIG 8

METHOD FOR PRODUCING A SCATTERED RADIATION GRID OR COLLIMATOR

FIELD OF THE INVENTION

The present invention relates to a method for producing a scattered radiation grid or collimator, in particular for x- or gamma radiation.

BACKGROUND OF THE INVENTION

In radiography, stringent requirements are currently placed on the image quality of the x-ray images. In such images, as are taken especially in medical x-ray diagnosis, an object to be studied is exposed to x-radiation from an approximately point radiation source, and the attenuation distribution of the x-radiation is registered two-dimensionally on the opposite side of the object from the x-ray source. Line-by-line acquisition of the x-radiation attenuated by the object can also be carried out, for example in computer tomography systems. Besides x-ray films and gas detectors, solid-state detectors are being used increasingly as x-ray detectors, these generally having a matrix arrangement of optoelectronic semiconductor components as photoelectric receivers. Each pixel of the x-ray image should ideally correspond to the attenuation of the x-radiation by the object on a straight axis from the point x-ray source to the position on the detector surface corresponding to the pixel. X-rays which strike the x-ray detector from the point x-ray source in a straight line on this axis are referred to as primary beams.

The x-radiation emitted by the x-ray source, however, is scattered in the object owing to inevitable interactions, so that, in addition to the primary beams, the detector also receives scattered beams, so-called secondary beams. These scattered beams, which, depending on the properties of the object, can cause up to 90% or more of the total signal response of an x-ray detector in diagnostic images, constitute an additional noise source and therefore reduce the identifiability of fine contrast differences. This substantial disadvantage of scattered radiation is due to the fact that, owing to the quantum nature of the scattered radiation, a significant additional noise component is induced in the image recording.

In order to reduce the scattered radiation components striking the detectors, so-called scattered radiation grids are therefore interposed between the object and the detector. Scattered radiation grids consist of regularly arranged structures that absorb x-radiation, between which transmission channels or transmission slits for minimally attenuated transmission of the primary radiation are formed. These transmission channels or transmission slits, in the case of focused scattered radiation grids, are aligned with the focus of the x-ray tube according to the distance from the point x-ray source, that is to say the distance from the focus. In the case of unfocused scattered radiation grids, the transmission channels or transmission slits are oriented perpendicularly to the surface of the scattered radiation grid over its entire area. However, this leads to a significant loss of primary radiation at the edges of the image recording, since a sizeable part of the incident primary radiation strikes the absorbing regions of the scattered radiation grid at these points.

In order to achieve a high image quality, very stringent requirements are placed on the properties of x-ray scattered radiation grids. The scattered beams should, on the one hand, be absorbed as well as possible, while on the other hand, the highest possible proportion of primary radiation should be transmitted unattenuated through the scattered radiation grid. It is possible to achieve a reduction of the scattered beam component striking the detector surface by a large ratio of the height of the scattered radiation grid to the thickness or diameter of the transmission channels or transmission slits, that is to say by a high aspect ratio. The thickness of the absorbing structure elements or wall elements lying between the transmission channels or transmission slits, however, can lead to image perturbations by absorption of part of the primary radiation. Specifically when solid-state detectors are used, inhomogeneities of the grids, that is to say deviations of the absorbing regions from their ideal position, cause image perturbations by projection of the grids in the x-ray image. For example, in the case of matricially arranged detector elements, there is a risk of projection of the structures of detector elements and scattered radiation grids mutually interfering. Perturbing moiré phenomena can thereby arise.

In order to minimize image perturbations due to scattered radiation grids, it is known to move the grids in a lateral direction during the recording. In the case of very short exposure times of, for example, 1–3 ms, however, stripes may also occur in the image if the movement speed of the grids is insufficient. Even in the event of very long exposure times, perturbing stripes may occur owing to reversal of the grid movement direction during exposure.

A particular disadvantage of all known scattered radiation grids is that the absorbing structure elements cannot be made arbitrarily thinly and precisely, so that a significant part of the primary radiation is always removed by these structure elements.

The same problem occurs in nuclear medicine, especially when using gamma cameras, for example Anger cameras. With this recording technique also, as with x-ray diagnosis, it is necessary to ensure that the fewest possible scattered gamma quanta reach the detector. In contrast to x-ray diagnosis, the radiation source for the gamma quanta lies inside the object in the case of nuclear diagnosis. In this case, the patient is injected with a metabolic preparation labeled with particular unstable nuclides, which then becomes concentrated in a manner specific to the organ. By detecting the decay quanta correspondingly emitted from the body, a picture of the organ is then obtained. The profile of the activity in the organ as a function of time permits conclusions about its function. In order to obtain an image of the body interior, a collimator that sets the projection direction of the image needs to be placed in front of the gamma detector. In terms of functionality and structure, such a collimator corresponds to the scattered radiation grid in x-ray diagnosis. Only gamma quanta dictated by the preferential direction of the collimator can pass through the collimator, and quanta incident obliquely to it are absorbed in the collimator walls. Because of the higher energy of gamma quanta compared with x-ray quanta, collimators need to be made many times higher than scattered radiation grids for x-radiation.

For instance, scattered quanta may be deselected during the image recording by taking only quanta with a particular energy into account in the image. However, each detected scattered quantum entails a dead time in the gamma camera of, for example, one microsecond, during which no further events can be registered. Therefore, if a primary quantum arrives shortly after a scattered quantum has been registered, it cannot be registered and it is lost from the image. Even if a scattered quantum coincides temporally—within certain limits—with a primary quantum, a similar effect arises. Since the evaluation electronics can then no longer separate the two events, too high an energy will be determined and the event will not be registered. Both said situations explain how highly effective scattered beam suppression leads to improved quantum efficiency in nuclear diagnosis as well. As the end result, an improved image quality is thereby achieved for equal dosing of the applied radionuclide or, for equal image quality, a lower radionuclide dose is made possible, so that the patient's beam exposure can be reduced and shorter image recording times can be achieved.

There are currently various techniques for producing scattered radiation grids for x-radiation and collimators for gamma radiation. For instance, lamellar scattered radiation grids are known, which are made up of lead and paper strips. The lead strips are used for absorption of the secondary radiation, while the paper strips lying between the lead strips form the transmission slits for the primary radiation. However, the limited precision when producing such scattered radiation grids, as well as the fact that the thickness of the lead lamellae cannot be reduced further, entail, on the one hand, an undesired loss of primary radiation and, on the other hand, in the case of matricially arranged detector elements of a solid-state detector, problems in the image quality due to moire stripes and/or grid stripes.

Collimators for gamma cameras are generally produced from mechanically folded lead lamellae. This is a relatively cost-efficient solution, although it has the disadvantage that, in particular when using solid-state cameras with matricially arranged detector elements, for example in the case of cadmium-zinc telluride detectors, perturbing aliasing effects can arise because the structure of these collimators is then relatively coarse.

For producing scattered radiation grids for x-radiation, U.S. Pat. No. 5,814,235 A discloses a method in which the scattered radiation grid is constructed from individual thin metal film layers. The individual metal film layers consist of a material that strongly absorbs the x-radiation, and they are photolithographically structured with corresponding transmission holes. To that end, a photoresist needs to be applied on both sides of the respective film and exposed through a photomask. This is followed by an etching step, in which the transmission holes are etched into the film material. After the remaining photoresist layer has been removed, an adhesion layer is applied to the etched metal films. The metal films are then positioned exactly above one another and are joined together to form the scattered radiation grid. The structure is consolidated by a subsequent heat treatment. In this way, it is possible to produce cellular scattered radiation grids with air gaps as transmission channels, which are suitable for applications in mammography and general radiography. In this case, the photolithographic etching technique permits more precise definition of the absorbing and nonabsorbing regions inside the scattered radiation grid than is possible with lead lamellae. By using different masks from one metal film to another—in each case with transmission holes that are mutually offset slightly it—is also possible to produce focused scattered radiation grids by using this technique. However, a scattered radiation grid for x-radiation needs a large number of such metal film layers, which in turn require a large number of different masks and production steps. The method is therefore very time-consuming and cost-intensive.

U.S. Pat. No. 6,185,278 B1 discloses a further method for producing a scattered radiation grid for x- and gamma rays, in which individual metal films are likewise photolithographically etched and laminated above one another. In this method, however, in order to produce a focused scattered radiation grid, groups of metal film layers with exactly the same arrangement of the transmission holes are assembled together, and only the individual groups have transmission holes arranged mutually offset. This technique reduces the number of photolithographic masks necessary for producing the scattered radiation grid.

A further method for producing a scattered radiation grid for x-radiation is disclosed by U.S. Pat. No. 5,303,282. This method uses a substrate made of photosensitive material, which is exposed by using a photomask according to the transmission channels to be produced. The channels are then etched from this substrate according to the exposed regions. The surface of the substrate, as well as the inner walls of the transmission channels, are coated with a sufficient thickness of a material that absorbs the x-radiation. In order to increase the aspect ratio, a plurality of such prepared substrates are optionally stacked above one another. Similar production techniques for producing cellular scattered radiation grids for x-radiation are described in EP 0 681 736 B1 or U.S. Pat. No. 5,970,118 A. Etching transmission channels into thicker substrates, however, leads to a loss of precision of the channel geometry.

The publication by G. A. Kastis et al., "A Small-Animal Gamma-Ray Imager Using a CdZnTe Pixel Array and a High Resolution Parallel Hole Collimator" discloses a method for producing a cellularly constructed collimator for gamma radiation. In this case as well, the collimator is produced from laminated layers of metal films, here made of tungsten, which are photochemically etched. This production method is therefore also very elaborate and cost-intensive.

SUMMARY OF THE INVENTION

On the basis of this prior art, it is an object of the present invention to provide a method for producing a scattered radiation grid or a collimator with a high aspect ratio and very fine absorbing structure elements, which requires reduced manufacturing outlay.

In the present method, a technique of rapid prototyping is used for producing the scattered radiation grid or collimator. In this case, the geometry of the transmissive and the nontransmissive regions of the scattered radiation grid or collimator is set first. Next, by means of a rapid prototyping technique through layer-wise solidification of a structural material under the action of radiation, in particular laser radiation, a base body is constructed according to the geometry, optionally differing by a particular layer thickness, of the transmissive regions or the nontransmissive regions. The base body may in this case also have a baseplate, which is likewise made by means of the rapid prototyping technique. It is of course furthermore possible to construct the base body on a separate support plate that can be removed from the construction platform of the rapid prototyping system. On the basis of this base body, the scattered radiation grid or collimator is finally made, or completed.

By using a rapid prototyping technique when constructing the base body, which is finally used as a basis for the scattered radiation grid or collimator, very filigree structures can be produced with very high accuracy. This is advantageous, in particular, for producing thin absorbing regions or walls of the scattered radiation grid or collimator. Furthermore, the base body can be produced very simply in this way, without needing to perform a large number of elaborate method steps. The overall production process, up until the finished scattered radiation grid or collimator is obtained, is hence greatly simplified and can be carried out cost-effectively.

In the rapid prototyping technique, 3D CAD designs, here the geometry of the base body, are converted into volume data in the CAD system. The 3D volume model for the rapid prototyping is then divided into cross sections in a computer. The cross sections have a layer thickness of 100 μm or less. After the data have been sent to a rapid prototyping system, the original shape is built up layer by layer. The present method in this case uses a rapid prototyping technique in which the layer construction is carried out by action of radiation, in particular laser radiation. Laser radiation, specifically, offers the advantage of producing very filigree structures in this case.

The scattered radiation grid or collimator itself may either contain the base body as a basis structure or be produced from it by single or multiple replication. Suitable replication processes are known to the person skilled in the art, and can be carried out simply and cost-effectively.

The scattered radiation grids or collimators that can be produced by the present method may have arbitrary geometries of the nontransmissive regions for the scattered radiation, or secondary radiation, to be correspondingly absorbed. For instance, all geometries known from the prior art, for example cellular structures or structures with slit transmission holes, may be produced. In particular, there is no difference in the production technology irrespective of whether focused or parallel scattered radiation grids or collimators are produced. For producing scattered radiation grids or collimators with a different focal length, no changes need to be made to any of the masks during production.

The production technique for producing a scattered radiation grid for x-radiation is no different from the production technique for producing a collimator for gamma quanta. Merely the materials used for producing the nontransmissive regions may differ. Furthermore, a gamma collimator is produced with a height increased many times compared with a scattered radiation grid for x-radiation.

In a preferred embodiment of the present method, the technique of stereolithography is used for constructing the base body. In this method, a computer-controlled UV laser beam forms the respective contours of the individual layers of the 3D volume model of the base body on a liquid polymer resin. The resin is cured under the action of the laser at the exposed points or areas. The component platform of the system is then lowered, and a new thin layer of photopolymer resin is applied. By repeating these steps, the complete geometry of the base body is successively constructed from the bottom upward. The component produced in this way can then be further hardened and mechanically processed further.

In an advantageous embodiment of the present method, the base body is constructed according to the geometry, reduced by a particular layer thickness, of the nontransmissive regions. A layer of a material that strongly absorbs the scattered radiation is then applied directly onto the accessible areas of this base body according to the particular layer thickness, so that the nontransmissive region is hence formed according to the desired geometry of the scattered radiation grid or collimator. The coating may be carried out, for example, by sputtering of a metallic starter layer and subsequent electrolytic coating. In this way, the base body produced by means of the rapid prototyping technique is a constituent part of the completed scattered radiation grid or collimator. It is self-evident that the coating also takes place on the inner side walls of the transmission holes of the base body.

In a further embodiment, the base body is constructed exactly according to the geometry of the transmissive regions. In this case, it is necessary to construct the base body on a support plate that can be removed from the construction platform, or to produce this support plate as a constituent part of the base body by means of the rapid prototyping technique. The gaps resulting in the base body, which correspond to the future nontransmissive regions of the scattered radiation grid or collimator, are subsequently filled with a material that strongly absorbs the scattered radiation. This filling is advantageously carried out by casting with eutectics, alloys or elements, which advantageously contain lead, tin, bismuth, cadmium, indium, mercury or gallium. It is furthermore possible for absorbing elements mixed with or dissolved in a liquid adhesive to be applied mechanically into the gaps. This may, for example, be done by using a blade, pressing, casting or printing technology methods. It may furthermore be advantageous to use reduced air pressure or vacuum during the filling, in order to reduce or avoid air inclusions.

In this way, a scattered radiation grid or collimator is obtained with structure elements or wall elements made of the absorbing materials. The base body may subsequently be removed or, in the case of a structural material that is substantially transmissive for the corresponding primary radiation, it may also remain in order to increase the stability as a constituent part of the scattered radiation grid or collimator.

In a further embodiment, the base body is constructed exactly according to the geometry of the nontransmissive regions. The base body is subsequently replicated, so that a negative mold is obtained. In this negative mold, corresponding to the previous exemplary embodiment, the gaps are then filled with absorbing material. This replication technique offers the advantage that a material with high transmission for the corresponding primary radiation and/or with high stability can be used for the negative mold.

The replication technique may also be used in arbitrary variants, for example in order to make a copy of the base body from the same material or from another material. This copy can then be used to produce the scattered radiation grid or collimator in the same way as the base body itself in the previous exemplary embodiments. By making several copies of the base body by double replication in each case—first into a negative mold, from which the positive mold is then in turn replicated—it is possible to produce a large number of scattered radiation grids or collimators very quickly and cost-effectively from a single base body, which is used as a master. The time-consuming process for producing the master base body then needs to be carried out only once.

It is furthermore possible to make the base body according to a geometry, extended by a particular layer thickness, of the transmissive regions and subsequently to replicate it into a negative mold. This negative mold can then, as in the former exemplary embodiment, be coated with a layer of an absorbing material, until the exact geometry of the nontransmissive region is reached.

Besides stereolithography as a rapid prototyping technique for making the base body, it is of course also possible to use the technique of microstereolithography. In this technique, each layer is exposed by single exposure by using a pattern-corresponding to the regions to be exposed. In this case, for example, micromirror arrays may be used for producing the pattern that differs from layer to layer, as is known from the prior art.

It is furthermore possible to use the method of selective laser sintering or laser melting for making the base body. This technique involves a method of local fusion or melting of starting material in powder form by a $CO_2$ laser. The material is built up layer-wise on a construction platform. The laser beam is controlled along the component cross section of the respective layer by using the data of the 3D volume model. The processing or solidification of a layer thickness of about 0.1 to 0.2 mm is carried out layer by layer. When the construction platform is lowered, the powder container provides the powder quantity for a further layer, and this is distributed using a corresponding leveler element. The energy delivered by the laser is absorbed by the powder and leads to local solidification of the material. In this way, a scattered radiation grid or collimator can also be constructed directly from the corresponding absorbing material, so that no further steps are needed any longer for completing the scattered radiation grid or collimator after the base body has been completed—apart from optionally required deburring of the base body and removal of support structures.

Of course, other rapid prototyping methods may also be used besides those mentioned so far, for example the LAM method (laminated object manufacturing), for producing the scattered radiation grid or collimator according to the present invention.

BRIEF DESCRIPTION OF THE DRAWINGS

The present method will be explained again briefly below with the aid of exemplary embodiments in conjunction with the drawings, without restricting the general inventive concept.

DETAILED DESCRIPTION OF THE INVENTION

Figure 1:
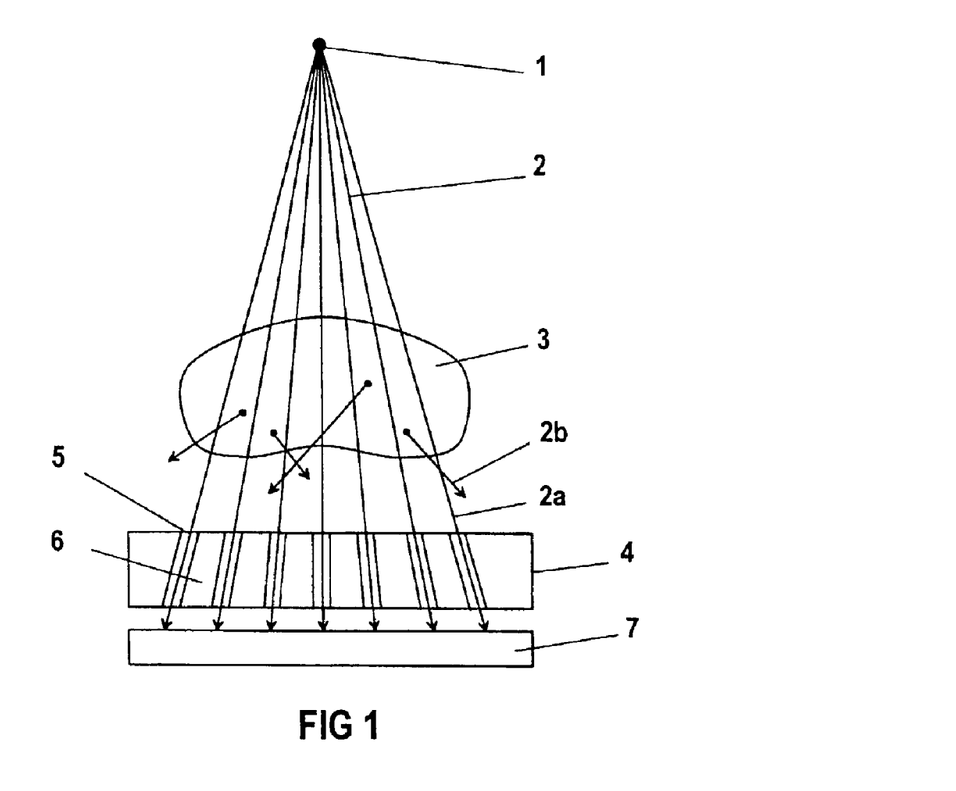
FIG. 1 schematically shows the action of a scattered radiation grid when recording x-ray images of an object.

The typical situation when recording an x-ray image of an object 3 in x-ray diagnosis is represented schematically with the aid of FIG. 1. The object 3 lies between the tube focus 1 of an x-ray tube, which may be regarded as an approximately point x-ray source, and a detector surface 7. The x-rays 2 emitted from the focus 1 of the x-ray source propagate in a straight line in the direction of the x-ray detector 7, and in doing so pass through the object 3. The primary beams 2a striking the detector surface 7, which pass through the object 3 on a straight line starting from the x-ray focus 1, cause, on the detector surface 7, a positionally resolved attenuation value distribution for the object 3. Some of the x-ray beams 2 emitted from the x-ray focus 1 are scattered in the object 3. The scattered beams 2b created in this case do not contribute to the desired image information and, when they strike the detector 7, they significantly impair the signal-to-noise ratio. In order to improve the image quality, a scattered radiation grid 4 is therefore arranged in front of the detector 7. This scattered radiation grid 4 has transmission channels 5 and absorbing regions 6. The transmission channels 5 are aligned in the direction of the tube focus 1, so that they allow the incident primary radiation 2a on a straight-line path to strike the detector surface. Beams not incident in this direction, in particular the scattered beams 2b, are blocked or significantly attenuated by the absorbing regions 6. However, on the basis of the previously known production techniques, the absorbing regions can be produced only with a particular minimum thickness, so that a significant part of the primary radiation 2a is therefore also absorbed and does not contribute to the image result.

Figure 2:
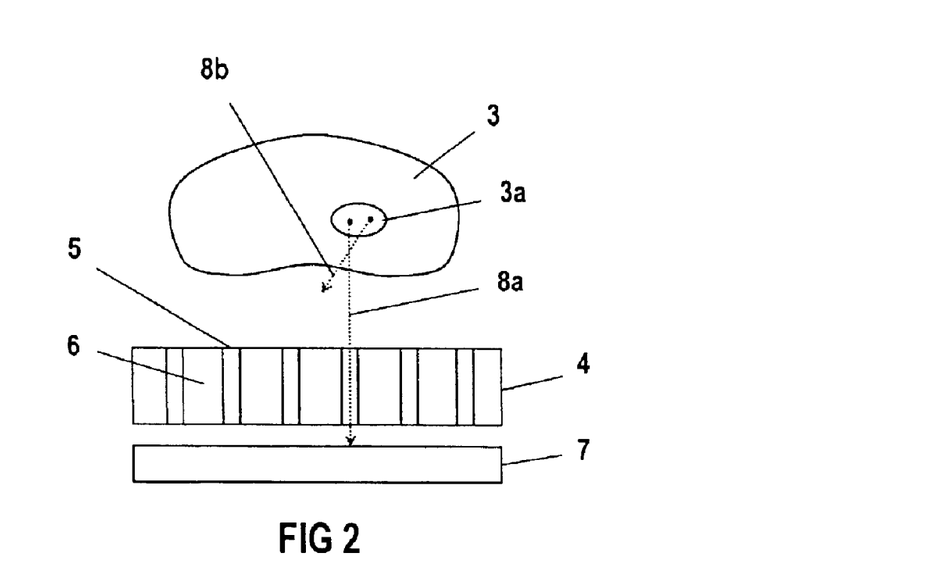
FIG. 2 schematically shows the situation when using a collimator during the nuclear medical recording of an object.

FIG. 2 shows the situation when recording images in nuclear diagnosis. The body 3 to be examined, in which an organ 3a is indicated, can be seen in the figure. By injection of a medium which emits gamma radiation, and which concentrates in the organ 3a, gamma quanta 8a are emitted from this region and strike the detector 7, an Anger camera. By means of the collimator 4 arranged in front of the detector 7, which has transmission channels 5 aligned in a straight line between regions 6 that absorb gamma radiation, the projection direction of the respective image recording is set. Gamma quanta 8b which are emitted in other directions or are scattered, and which do not arrive on a straight-line path from this projection direction, are absorbed by the collimator 4. In this technique as well, however, a significant part of the primary radiation 8a is still absorbed because the absorbing regions 6 are not arbitrarily thin.

The present invention provides a method which permits very precise manufacture of scattered radiation grids or collimators with very thin absorbing structures or separating walls 6 between the transmission channels 5. In this case, a rapid prototyping technique is used for producing the scattered radiation grid or collimator. An example of such a technique is stereolithography, as illustrated with the aid of the representation in FIG. 3. In this technique, a UV laser beam 12 is directed onto the surface of a liquid UV-crosslinkable polymer 10, which is situated in a container 9. The UV laser beam 12 is moved, with the aid of a three-dimensional volume model of the base body 13 to be made, over the surface of the liquid polymer 10 in order to construct the base body 13 layer-wise. After a layer has been solidified, it is lowered by a further layer thickness using a construction platform 11, so that the UV laser 12 can solidify the next layer according to the three-dimensional volume model. In this way, the base body 13 is constructed layer by layer from the crosslinked UV-cured polymer 10. Owing to the good focusability of the UV laser beam 12, very filigree structures can in this case be produced with very high accuracy. The base body 13 may be constructed directly on the construction platform 11 or on an additional support plate (not represented in the figure), which lies on the construction platform 11. Furthermore, the technique of stereolithography may also be used to construct a baseplate, on which the base body 13 is then formed according to the desired geometry.

Figure 4:
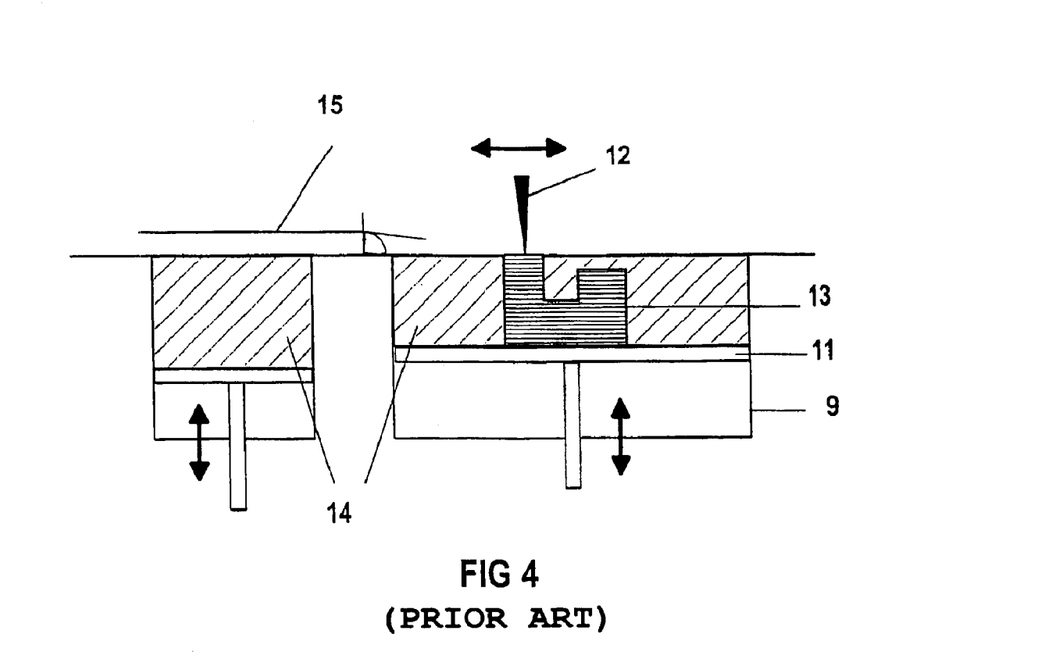
FIG. 4 shows a representation to illustrate the technique of selective laser sintering or laser melting.

A further technique for producing a base body as a basis for a scattered radiation grid or a collimator according to the present invention is represented in FIG. 4. FIG. 4 schematically shows the procedure for the technique of selective laser melting or laser sintering.

In this technique, a $CO_2$ laser beam 12 is guided over the surface of a material powder 14. During this, the laser fuses or melts the material powder 14, so that the latter is joined together after hardening. This fusion or melting in turn takes place layer-wise. After one layer has been made, the construction platform 11 is lowered by one layer thickness, and new material powder 14 is distributed in the construction plane by means of a slider 15. The next layer is then solidified in the same way by using the laser 12, in order finally to construct the component 13 layer by layer. The material powder 14 may be a metallic powder or a metallic powder coated with a plastic.

Figure 3:
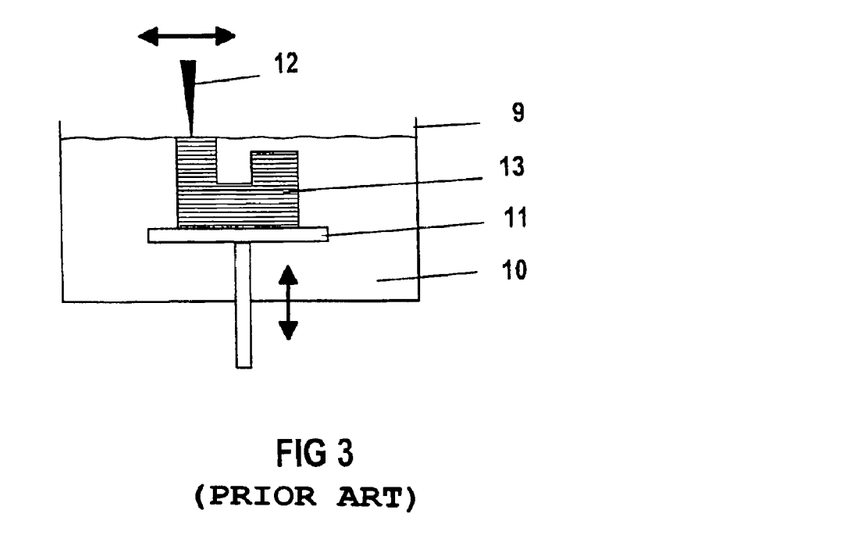
FIG. 3 shows a representation to illustrate the technique of stereolithography.

In principle, absorption structures or absorption walls 6 that have a small thickness of about 50 $\mu$m can be produced between the transmission channels 5 by using the two methods of FIGS. 3 and 4. Through suitable adjustment of the parameters, it is also possible to achieve thicknesses as low as 20 $\mu$m.

Figure 5:
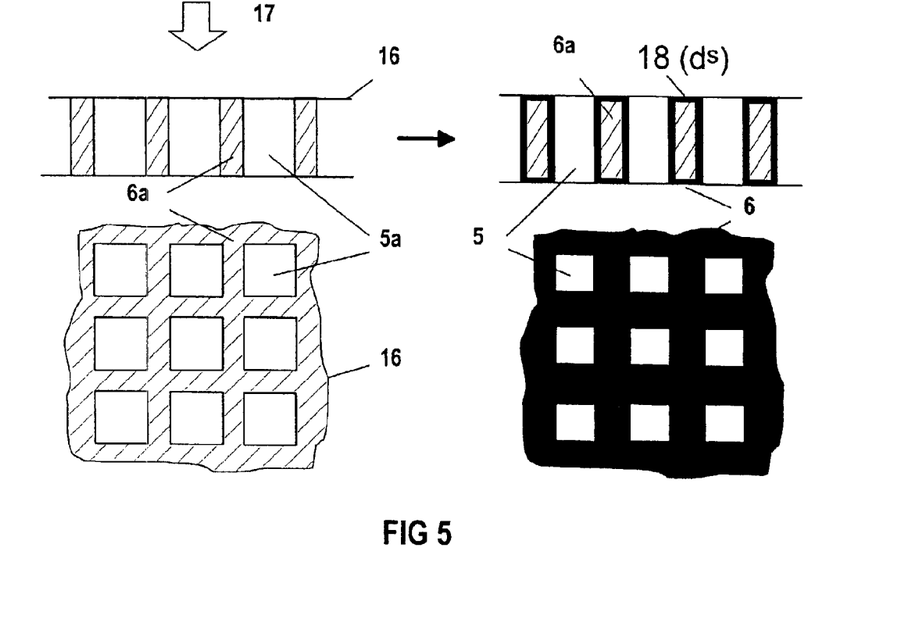
FIG. 5 schematically shows an example of the production of a scattered radiation grid or collimator from a base body.

A scattered radiation grid or collimator can be made in various ways from a base body produced in this way—for example according to the techniques of FIG. 3 or 4. An example of this is given in FIG. 5. In this embodiment, a base body 16 is produced according to the geometry of the geometry, reduced by a particular layer thickness $d_s$, of the nontransmissive regions 6 of the scattered radiation grid or collimator to be made. The thickness of the regions 6a represented in this example for the base body 16 made of the structural material, for example the UV-cured polymer, is therefore $2*d_s$ less than the thickness of the nontransmissive bars 6 to be produced for the scattered radiation grid or collimator. The same applies to the height of these regions 6a. A base body 16 produced in such a way is subsequently coated (coating step 17) with an absorbing material of high atomic number. In this case, the layer thickness of this coating 18 corresponds to the layer thickness $d_s$ by which the structures 6a of the base body 16 have been made less than the nontransmissive regions 6 to be produced for the scattered radiation grid or collimator. In this way, a scattered radiation grid or collimator as represented in the right-hand part of FIG. 5 is finally obtained. The figure respectively shows a detail of the base body 16, and of the scattered radiation grid or collimator produced from it, in cross section (top) and in plan view (bottom). The scattered radiation grid or collimator, in this exemplary embodiment, is thus made up of the base body 16 with the regions 6a of the structural material as a subframe, on which an absorbing coating 18 is applied in order to form the nontransmissive regions 6. The transmission channels 5 lie between these nontransmissive regions 6, which advantageously form thin bars. The transmission channels 5 may be aligned in the direction of the tube focus, depending on the properties of the desired scattered radiation grid or collimator.

For application of the coating 18, a thin copper layer may, for example, firstly be applied to the surface of the regions 6a by sputtering. The thickness of this copper layer lies in the $\frac{1}{10}$ $\mu$m range. A lead-tin alloy is finally applied onto this layer by electrolytic deposition. The thickness of this alloy is designed so as to achieve the necessary absorption of the secondary radiation.

Especially for mammography applications, in which the energy of the employed x-ray spectrum is relatively low, a very thin absorber layer 18 on the structures 6a of the base body 16 is sufficient. Merely with a 2 $\mu$m thick lead layer, for example, about 84% absorption is obtained at average mammography x-ray energies (20 keV). For the same absorption with double-sided coating, as is the case in the present exemplary embodiment, a 1 $\mu$m thickness $d_s$ of the layer 18 is hence sufficient for good absorption of the secondary radiation. Such a thin layer furthermore has the advantage that it entails significantly reduced absorption of the energetic primary radiation, so that better selectivity of the scattered radiation grid is achieved.

Figure 6:
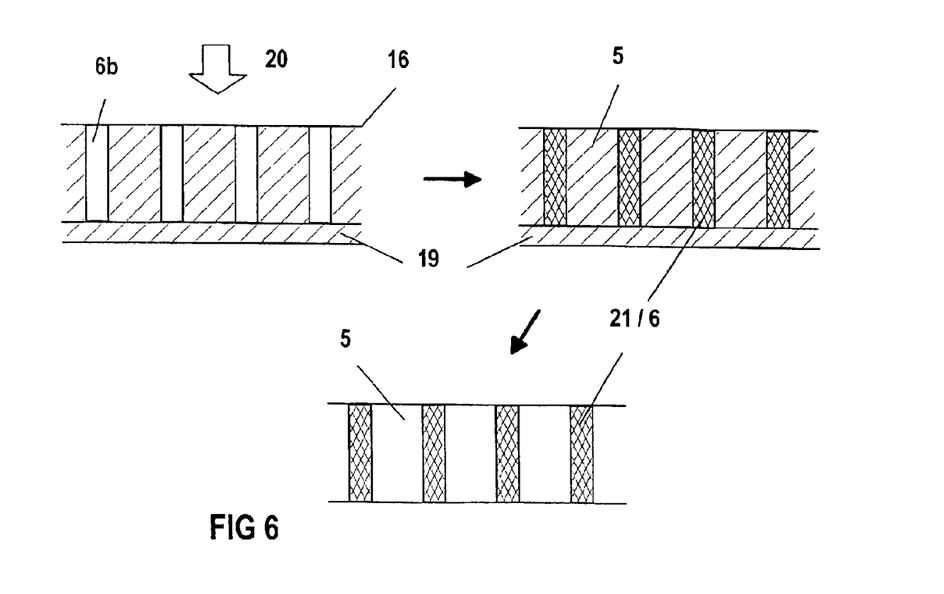
FIG. 6 schematically shows a further example of the production of a scattered radiation grid or collimator from a base body.

FIG. 6 shows a further example of making a scattered radiation grid or collimator from a base body 16. The base body 16 has in this case been applied to a baseplate 19 or formed with the latter. The base body 16 has been produced here according to the geometry of the transmissive regions 5 of the scattered radiation grid or collimator to be made. Since the transmissive regions 5 are not generally designed to be continuous, the baseplate 19 is needed for making such a base body. The intermediate gaps 6b of this base body 16 are finally filled with a material 21 of high atomic number in the liquid state (filling 20), which substantially absorbs the corresponding secondary radiation. This material 21, for example a lead-tin-indium alloy, solidifies after cooling. In this way, a scattered radiation grid or collimator is obtained which has nontransmissive regions, preferably as thin bars 6, between which transmissive regions 5 are formed, advantageously as channels with a high aspect ratio. The channels may in this case consist of the structural material of the base body 16, if it is sufficiently transmissive for the respective primary radiation. In the same way, the baseplate 19 may also remain as a constituent part of the scattered radiation grid or collimator, in order to increase its stability. Of course, the material of the base body 16 may also be subsequently removed, so that merely the frame of the absorbing material 21 is left as a scattered radiation grid or collimator.

Figure 7:
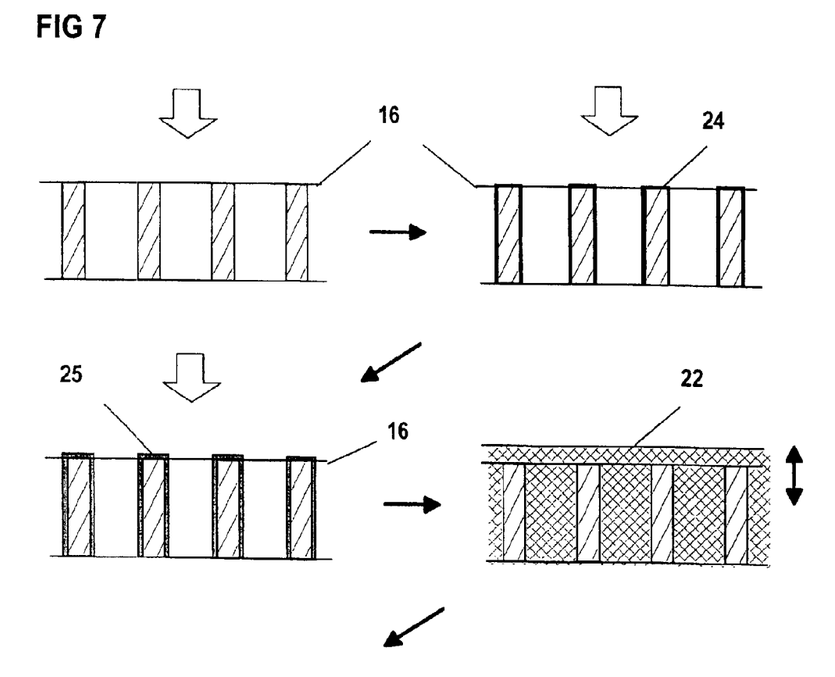
FIG. 7 schematically shows a further example of the production of a scattered radiation grid or collimator from a base body.

Lastly, FIG. 7 shows a further example of making a scattered radiation grid from a base body 16 produced by means of a rapid prototyping technique. In this example, the base body 16 is constructed according to the geometry of the absorbing regions 6 of the scattered radiation grid or collimator. The thickness and height of the structural regions 6a hence correspond exactly to the thickness and height of the absorbing regions or bars 6 of the scattered radiation grid or collimator. This base body 16 is subsequently replicated into a negative mold 22, for example by introducing or casting nickel, so that the material regions of the negative mold correspond to the transmission regions 5 of the scattered radiation grid or collimator. A scattered radiation grid or collimator can subsequently be made from this negative mold 22 according to the procedure of FIG. 6.

In the same way, it is possible to make a negative mold which is subsequently coated according to the exemplary embodiment of FIG. 5. To that end, the base body 16 to be made firstly needs to be constructed according to the geometry of the transmission regions 5 extended by a particular layer thickness $d_s$. By replicating this base body 16, a negative mold 22 that has the shape of the base body 16 of FIG. 5 is then obtained.

Figure 8:
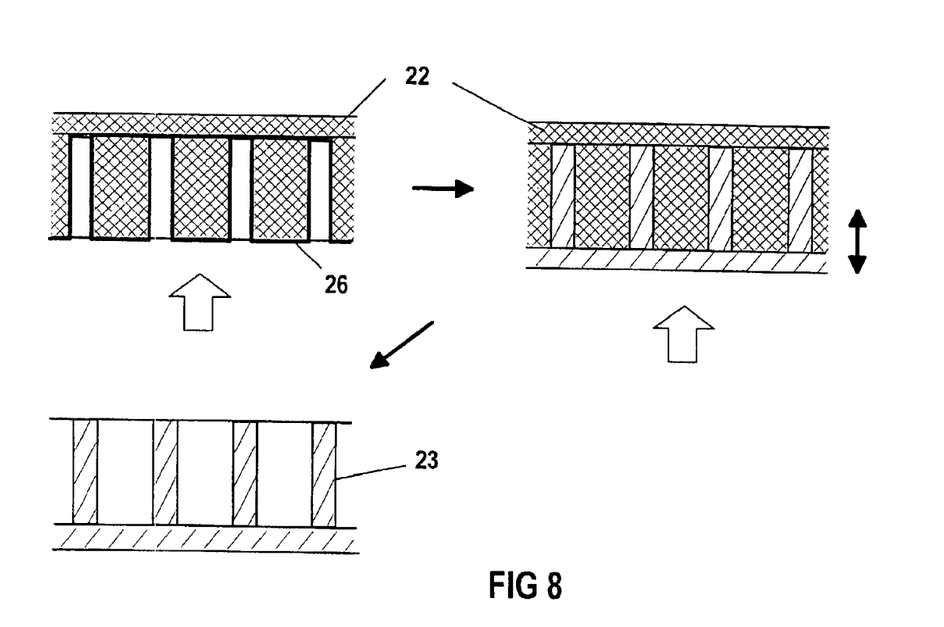
FIG. 8 schematically shows an example of multiple replication of a base body before completion of the scattered radiation grid or collimator.

Lastly, FIG. 8 shows a further example of making a scattered radiation grid or collimator from a base mold 16 made by means of rapid prototyping. In this example, the base mold 16 is firstly replicated into a negative 22, which is in turn subsequently replicated into a positive 23, that is to say an exact copy of the base body 16. This technique has the advantage that an almost arbitrary number of copies 23, from which the scattered radiation grid is finally formed, can be made from a base body 16 as a master. The time-consuming process of rapid prototyping for making the base body 16 needs to be carried out only once here.

In order to make the copies 23, the base body 16 which, for example, may be made from a polymer material by stereolithography, is firstly coated with an 80 nm thick titanium adhesion layer and a 160 nm thick nickel starter layer 24. This coating is advantageously carried out by sputtering. A 10 μm thick NiP layer 25 is subsequently applied to this thin coating by electroless deposition. In the next step, nickel is electrolytically deposited with a thickness of 0.5 mm on the resulting structure. The structure is thereby transferred onto the nickel material which, as a negative mold 22 of the base body 16, can be detached from the latter. The resulting negative mold 22 is finally coated with a passivation layer 26. Nickel is subsequently deposited again with a thickness of 1.5–2.5 mm into this negative mold 22 by electrolytic deposition. A positive mold 23, which has exactly the structure of the original base body 16, is obtained in this way. The positive mold 23 is separated from the negative mold 22, and can be used either directly as a scattered radiation grid or collimator or in turn as a casting mold for making such a grid or collimator.

With the present exemplary embodiments, for example, it is possible to make scattered radiation grids or collimators with a cellular grid of dimensions 55 mm×95 mm×2 mm and a grid width of 700 μm. The absorbing intermediate walls have a thickness of 50 μm and consist of a low-melting, liquid eutectic material that primarily contains lead. It is furthermore possible, for example, to make scattered radiation grids or collimators with the same dimensions, in which the absorbing intermediate walls are coated with a lead alloy of thickness 5–10 μm.

What is claimed is:

1. A method for producing a scattered radiation grid or collimator which, for an incident radiation type, has transmissive regions (5) and nontransmissive regions (6) of predeterminable geometry, the method comprising the following steps:
   setting the geometry of the transmissive (5) and the nontransmissive regions (6) of the scattered radiation grid or collimator;
   constructing a base body (16) according to the geometry, optionally differing by a particular layer thickness, of the transmissive regions (5) or the nontransmissive regions (6) by means of a rapid prototyping technique through layer-wise solidification of a structural material under the action of radiation; and
   completing the scattered radiation grid or collimator on the basis of the base body (16).

2. The method as claimed in claim 1, wherein a method of stereolithography is used as the rapid prototyping technique for construction of the base body (16).

3. The method as claimed in claim 1, wherein a method of selective laser melting or laser sintering is used as the rapid prototyping technique for construction of the base body (16).

4. The method as claimed in claim 1, wherein the base body (16) is constructed according to the geometry, reduced by a particular layer thickness, of the nontransmissive regions (6) and, in order to complete the scattered radiation grid or collimator, it is coated with a material that strongly absorbs the radiation type, until reaching the particular layer thickness which is sufficient to almost completely absorb incident secondary radiation of the radiation type.

5. The method as claimed in claim 4, wherein the coating is carried out by sputtering and/or electrolytic deposition.

6. The method as claimed in claim 1, wherein the base body (16) is constructed according to the geometry of the transmissive regions (5) and, in order to complete the scattered radiation grid or collimator, resulting gaps (6b) are filled with a material (21) that strongly absorbs the radiation type, which is subsequently solidified.

7. The method as claimed in claim 6, wherein the structural material of the base body (16) is removed after solidification of the strongly absorbing material (21).

8. The method as claimed in claim 1, further comprising making a copy (23) of the base body (16) by multiple replication, and using said copy to produce the scattered radiation grid or collimator.

9. The method as claimed in claim 1, wherein base body (16) is constructed, according to the geometry of the nontransmissive regions (6), from a structural material that strongly absorbs the radiation type, in order to form the scattered radiation grid or collimator directly.

10. The method as claimed in claim 1, wherein the geometry of the transmissive (5) and nontransmissive regions (6) is set in such a way that a focusing scattered radiation grid or collimator is formed.

11. The method as claimed in claim 1 for producing a scattered radiation grid for x-radiation.

12. The method as claimed in claim 1 for producing a collimator for gamma radiation.

13. The method as claimed in claim 2, wherein the base body (16) is constructed according to the geometry, reduced by a particular layer thickness, of the nontransmissive regions (6) and, in order to complete the scattered radiation grid or collimator, it is coated with a material that strongly absorbs the radiation type, until reaching the particular layer thickness which is sufficient to almost completely absorb incident secondary radiation of the radiation type.

14. The method as claimed in claim 3, wherein the base body (16) is constructed according to the geometry, reduced by a particular layer thickness, of the nontransmissive regions (6) and, in order to complete the scattered radiation grid or collimator, it is coated with a material that strongly absorbs the radiation type, until reaching the particular layer thickness which is sufficient to almost completely absorb incident secondary radiation of the radiation type.

15. The method as claimed in claim 2, wherein the base body (16) is constructed according to the geometry of the transmissive regions (5) and, in order to complete the scattered radiation grid or collimator, resulting gaps (6b) are filled with a material (21) that strongly absorbs the radiation type, which is subsequently solidified.

16. The method as claimed in claim 3, wherein the base body (16) is constructed according to the geometry of the transmissive regions (5) and, in order to complete the scattered radiation grid or collimator, resulting gaps (6b) are filled with a material (21) that strongly absorbs the radiation type, which is subsequently solidified.

17. The method as claimed in claim 2, further comprising making a copy (23) of the base body (16) by multiple replication, and using said copy to produce the scattered radiation grid or collimator.

18. The method as claimed in claim 3, further comprising making a copy (23) of the base body (16) by multiple replication, and using said copy to produce the scattered radiation grid or collimator.

19. The method as claimed in claim 3, wherein base body (16) is constructed, according to the geometry of the nontransmissive regions (6), from a structural material that strongly absorbs the radiation type, in order to form the scattered radiation grid or collimator directly.

20. The method as claimed in claim 1, wherein the base body (16) is constructed according to the geometry of the nontransmissive regions (6), and it is subsequently replicated to form a negative mold (22) in which, in order to complete the scattered radiation grid or collimator, resulting gaps are filled with a material (21) that strongly absorbs the radiation type, which is subsequently solidified.

21. The method as claimed in claim 20, wherein the negative mold (22) is removed after solidification of the strongly absorbing material (21).

* * * * *